US005524768A

United States Patent [19]

de Silva et al.

[11] Patent Number: 5,524,768

[45] Date of Patent: Jun. 11, 1996

[54] SEPARATOR FOR THE SEPARATION OF FLUIDIZABLE FROM NON-FLUIDIZABLE MATERIALS

[75] Inventors: Sunil R. de Silva, Porsgrunn; Gisle F. Knutsen, His; Morten Karlsen, Øvre Årdal, all of Norway

[73] Assignee: Norsk Hydro a.s, Oslo, Norway

[21] Appl. No.: 212,840

[22] Filed: Mar. 15, 1994

[30] Foreign Application Priority Data

Mar. 15, 1993 [NO] Norway ................................ 930920

[51] Int. Cl.[6] .............................. B07B 1/04; B65G 53/38

[52] U.S. Cl. .......................... 209/235; 209/246; 209/354; 209/393; 406/90

[58] Field of Search ................................ 209/21, 22, 23, 209/28, 29, 250, 313, 380, 393, 352, 354; 406/89, 90; 209/235, 246

[56] References Cited

U.S. PATENT DOCUMENTS

| | | | |
|---|---|---|---|
| 1,081,282 | 12/1913 | Westerfield | 209/29 X |
| 1,393,993 | 10/1921 | Fehring | 209/29 |
| 1,644,753 | 10/1927 | Stebbins | 209/29 X |
| 2,600,508 | 6/1952 | Lehman et al. | 209/393 X |
| 3,769,660 | 11/1973 | Schuette, Jr. | 209/28 X |
| 4,411,674 | 10/1983 | Fargac | 406/90 X |
| 4,855,039 | 8/1989 | Genev | 209/313 X |

*Primary Examiner*—William E. Terrell
*Assistant Examiner*—Tuan Nguyen
*Attorney, Agent, or Firm*—Wenderoth, Lind & Ponack

[57] ABSTRACT

A separator for separating two or more materials of which one or more consist(s) of a particulate, fluidisable material such as aluminum oxide, from a material which can not be fluidised such as nails, tools, coke, pieces of wood, and lumps of oxide. The separator comprises a chamber (1') in which are located one or more screens (7, 9) and one or more fluidising/transport channels (8, 10) underneath, at angles established in advance. The separator has no movable parts.

14 Claims, 2 Drawing Sheets

SEPARATOR FOR THE SEPARATION OF FLUIDIZABLE FROM NON-FLUIDIZABLE MATERIALS

BACKGROUND OF THE INVENTION

1. Field of the Invention

The present invention concerns a separator for separating two or more materials, of which one consists of a particulate, fluidisable powder material, such as aluminium oxide, $Al_2O_3$ (hereinafter called oxide), from a material which cannot be fluidised, such as, for example, nails, tools, coke, pieces of wood, lumps of oxide.

2. Description of Prior Art

Oxide is used as the main component when producing aluminium in a Hall-Heroult electrolysis process and is forwarded by bulk carrier ship from the supplier to the aluminium works. At works which produce anodes and/or cathodes, the oxide is unloaded in most cases using the same equipment as is used for unloading coke/anthracite. Undesired material components in the oxide can be transported and added during the various transport phases from an oxide works to the electrolysis cells. Furthermore, the oxide may become lumpy, which is not desirable from an operational point of view.

If undesired, non-fluidisable materials are introduced into the electrolysis cells' bath, this may cause operating problems in the electrolysis cells and a significant reduction in quality of the aluminium product.

In order to avoid the above-mentioned problems, a separator is usually inserted ahead of the electrolysis cells so that only fluidisable, i.e. purified, oxide is fed into the cells.

A number of procedures are known for separating oxide. Most of them have too little capacity on the one hand and the separating effect is too low on the other. Norwegian patent no. 167263 describes a device for separating fluidisable material from non-fluidisable material. An eddy layer apparatus and screens are used in a chamber which is placed on spiral springs. Furthermore, the chamber is vibrated mechanically and periodically to avoid the chamber becoming overfilled, as well as to increase the capacity. A disadvantage of this procedure is the wear caused to the chamber, the sleeves and the screens during vibration and eddies; in the long term this can be expensive on account of maintenance, repairs and production disturbances. Moreover, it is generally known that productivity is low with mechanical vibration screening.

SUMMARY OF THE INVENTION

The aim of the present invention was to improve the separating effect and the capacity in relation to that achieved when using known technology. A further aim was that the separator should not be too expensive to produce and keep in operation. Moreover, the aim was to avoid moving parts and eddies.

In accordance with the present invention, this was achieved by means of a separator as mentioned in the introduction and which is, furthermore, characterised by a chamber in which one or more screens or sieves are located, through which the fluidisable particle fractions are designed to fall down into one or more fluidising/transport channels and on to a lower outlet by means of a fluidising medium, for example air, introduced through supply devices, and the non-fluidisable material is designed to be fed down the screens to an upper outlet.

Further advantageous features of the present invention are defined below.

The present invention will be described in more detail in the following by means of examples and with reference to the enclosed drawings.

DETAILED DESCRIPTION OF THE INVENTION

Figure 1:
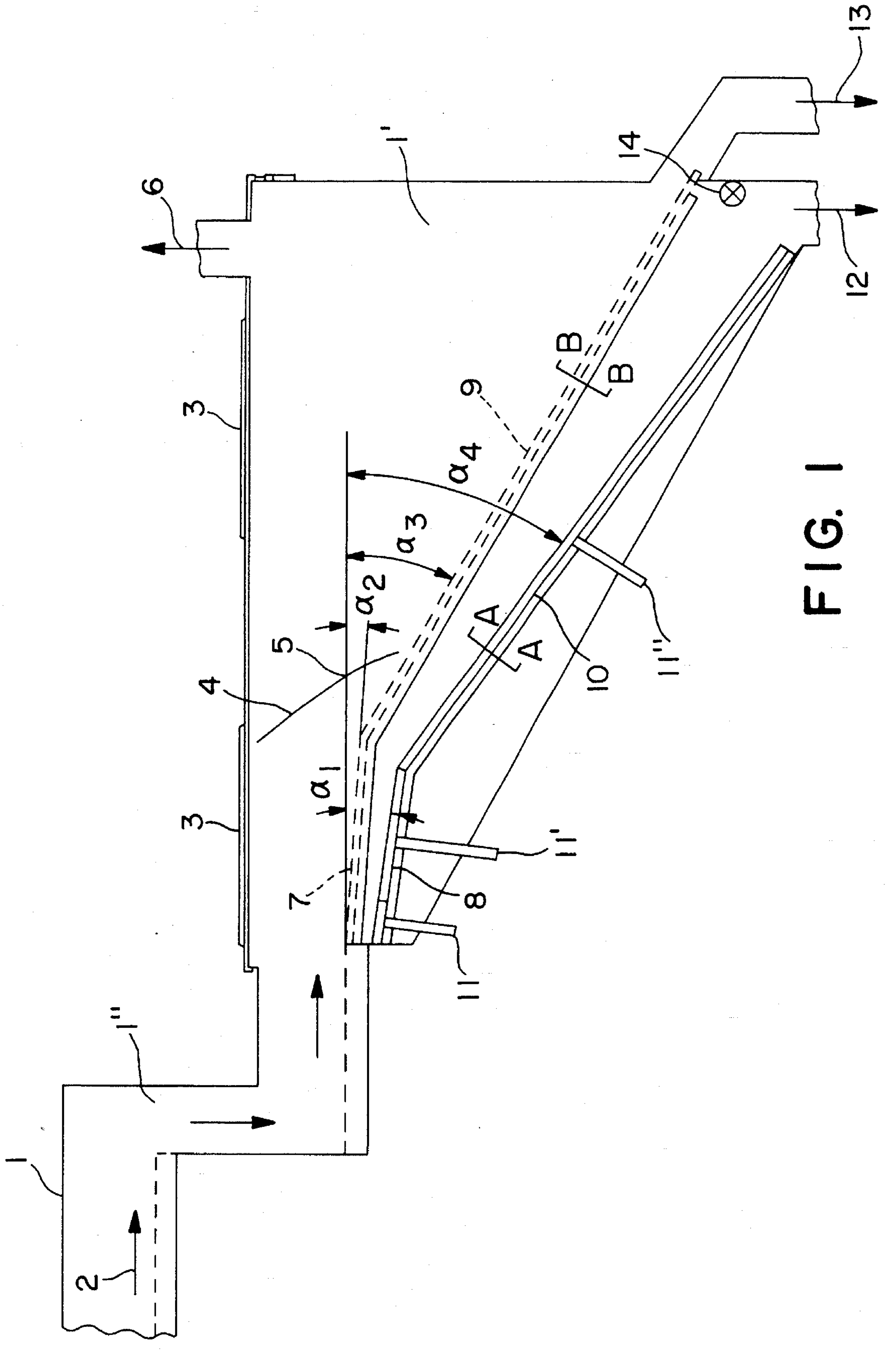
FIG. 1 shows the fundamental design of a separator in accordance with the present invention seen from the side.

The present invention provides a separator for separating two or more materials of which one consists of a particulate, fluidisable powder material, such as, for example, aluminum oxide, $Al_2O_3$ into components with different particle size and/or separating such materials, from an undesired material which can not be fluidised such as nails, tools, coke, pieces of wood, lumps of oxide, gloves etc., characterised by a chamber (1') in which are placed one or more screens (7, 9) through which the fluidisable particle fractions are designed to fall down into one or more fluidising/transport channels (8, 10) and on to a lower outlet (12) by means of a fluidising fluid, for example air, supplied via supply devices (11, 11', 11") and the non-fluidisable material is designed to be fed down the screens (7, 9) to an upper outlet (13).

The screens (7, 9) can consist of a number of longitudinal sections (22) with intermediate slit openings (25), which sections are made of a durable material, for example steel.

The sections (22) can have tapering cross-sections so that the width of the slit openings (25) increases downwards.

Separation can take place in two phases with two fluidising/transport channels (8, 10) and two screens (7, 9), and the angles of inclination of the screens and fluidising/transport channel in the first separation phase are preferably $\alpha_1$=8° and $\alpha_2$=4° and in the second separation phase preferably $\alpha_3$=30 ° and $\alpha_4$=36°.

Variations in the supply of raw materials can be eliminated in two stages by inserting an angle-shaped vertical transport channel (1") into the raw material inlet (1) and inserting a steel plate (4) with a mounted distribution plate (5) downstream above the screen (9).

The screens and the fluidising/transport channels can be integrated in one chamber (1').

One or more transparent, removable hatches (3) can be placed on the upper side of the chamber.

The chamber (1') can be provided with an extraction device (6) for dust particles.

The screens (7, 9) can have different openings to separate the fluidisable materials into components with different particle sizes.

As shown in FIG. 1, the raw material is fed into the separator by means of a fluidising/transport channel 1. This part of the fluidising/transport channel 1 is disposed with an angle relative to vertical part 1" shown in FIG. 1 and contributes to evening out variations in the raw material supply. In the first separation phase the fluidisable material falls through a screen 7 to a fluidising/transport channel 8 which has angles of inclination of $\alpha_1$ and $\alpha_2$ respectively.

The fluidisation and separation is greatest during this phase because the flow of the fluidising medium is greatest and the quantity of the fluidisable material is greatest here so that the majority of the fluidisable material with particle sizes which are equal to or less than the screen openings fall down into the fluidising/transport channel 8.

Further irregularities in the material flow are eliminated by means of a flexible distribution plate 5, which is fastened to a steel plate 4.

One or more transparent, removable hatches 3 are located on the upper side of the separator chamber to remove large objects such as tools, gloves, pieces of clothing, lumps of oxide.

The remaining fluidisable material, together with the non-fluidisable material, is fed downwards over the screen 7 and on to the second separation phase which takes place on the screen 9 which has an angle of inclination $\alpha_3$; from here the fluidisable material falls down into a fluidising/transport channel 10, which has an angle of inclination $\alpha_4$, and is fed to a lower outlet 12 which is provided with a level control means 14 to register if the separator should become overfilled.

The non-fluidisable material is fed further on down the screen 9 to an upper outlet 13.

Figure 2A:
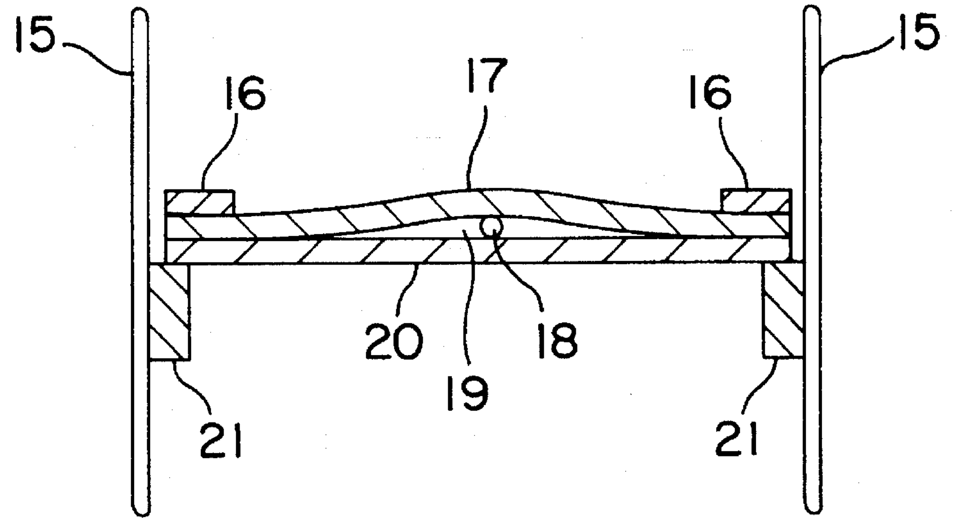
FIGS. 2A–2B shows the sections A—A and B—B marked in FIG. 1.
Figure 2B:
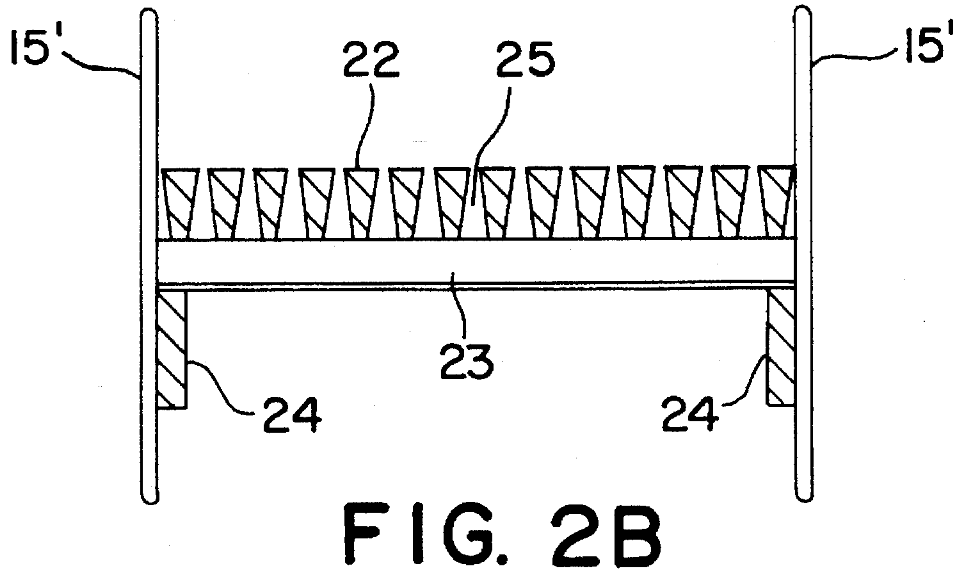

FIGS. 2A and 2B shows large-scale sections according to lines A—A and B—B in FIG. 1.

Section A—A shows a fluidising/transport channel with a fluidising membrane 17, fastening devices 16 and 21 and side walls 15, together with a longitudinal plate 20 with a cavity 18 between the longitudinal plate 20 and the fluidising membrane 17. A fluidising fluid, for example air, passes through the cavity 18 and the fluidising membrane 17. The fluid is supplied through devices 11, 11' and 11" (see FIG. 1) from a reservoir which is not shown.

The fluidising membrane 17 can be made of, for example, textile cloth, artificial cloth, metal cloth, sintered metal or sintered plastic material.

Section B—B shows a number of slits 22 which are formed by placing together longitudinal sections which are fastened to a tie bar 23 between the side walls 15' and supported by plates 24. The sections are preferably made of steel and placed with a space 25 between each section so that slit openings are formed between the sections. The sections preferably have tapering cross-sections so that the width of the openings increases downwards as shown on the drawing. The fluidisable material falls through the slit openings and down into the fluidising/transport channel 10 and, together with the material fluidised earlier in the process, is fed to the lower outlet 13.

When the invention is used in aluminium production, it is provided with an inlet for unseparated oxide, an outlet for fluidised, separated oxide and an outlet for non-fluidisable, undesired material components, as well as an outlet for dust particle fractions 6.

The purified oxide is fed, via a fluidising/transport channel, which is not described in detail, to electrolysis cells and the undesired components are fed to a collection container for further processing or deposition.

By already fluidising the raw material in the separator inlet phase and through the whole separation process, the result is that the fluidisable material behaves almost like a liquid, which results in much greater through-flow than when using mechanically vibrated screens.

The invention as defined in the enclosed claims is not limited to the separation of one or more fluidisable material from non-fluidisable materials, but may also be used to separate fluidisable material or materials into components with different particle or grain sizes by using screens with different openings in a series one after the other.

We claim:

1. A separator for separating two or more materials of which one consists essentially of a particulate, fluidisable powder material, into components with different particle size, or separating such materials from an undesired material which can not be fluidised, or conducting both said separating operations, which separator comprises a chamber (1') in which are placed one or more downwardly inclined nonvibrational screens (7, 9) through which the fluidisable particle fractions are designed to fall down into one or more downwardly inclined fluidising/transport channels (8, 10) and on to a lower outlet (12) by means of a fluidising fluid supplied via supply devices (11, 11', 11"), and the non-fluidisable material is designed to be fed down the screens (7, 9) to an upper outlet (13).

2. A separator in accordance with claim 1, wherein the particulate, fluidisable powder material is $Al_2O_3$.

3. A separator in accordance with claim 1, wherein the undesired material is a member selected from the group consisting of nails, tools, coke, pieces of wood, lumps of oxide and gloves.

4. A separator in accordance with claim 1, wherein the fluidising fluid is air.

5. A separator in accordance with claim 1, wherein the screens (7, 9) consist essentially of a number of longitudinal sections (22) with intermediate slit openings (25), which sections are made of a durable material.

6. A separator in accordance with claim 5, wherein the durable material is steel.

7. A separator in accordance with claim 5, wherein the sections (22) have tapering cross-sections so that the width of the slit openings (25) increase downwards.

8. A separator in accordance with any of claims 1, 5 or 7, wherein separation takes place in two phases with two fluidising/transport channels (8, 10) and two screens (7, 9).

9. A separator in accordance with claim 8, wherein the angles of inclination of the screens and fluidising/transport channel in the first separation phase are $\alpha_2$=4° and $\alpha_1$=8° and in the second separation phase $\alpha_3$=30° and $\alpha_4$=36°.

10. A separator in accordance with any of claims 1, 5 or 7, which further comprises a raw material inlet (1), an angle-shaped vertical transport channel (1") inserted into the raw material inlet (1), and a steel plate (4) with a mounted distribution plate (5) downstream above the screen (9), for eliminating, in two stages, variations in raw material supply to the separator.

11. A separator in accordance with any of claims 1, 5 or 7, wherein the screens and the fluidising/transport channels are integrated in one chamber (1').

12. A separator in accordance with claim 11, wherein one or more transparent, removable hatches (3) are placed on the upper side of the chamber.

13. A separator in accordance with any of claims 1, 5 or 7, wherein the chamber (1') is provided with an extraction device (6) for dust particles.

14. A separator in accordance with any of claims 1, 5 or 7, wherein the screens (7, 9) have different openings to separate the fluidisable materials into components with different particle sizes.

* * * * *